United States Patent
Pham et al.

(10) Patent No.: US 10,067,881 B2
(45) Date of Patent: Sep. 4, 2018

(54) COMPRESSION AND CACHING FOR LOGICAL-TO-PHYSICAL STORAGE ADDRESS MAPPING TABLES

(71) Applicant: HGST Netherlands B.V., Amsterdam (NL)

(72) Inventors: Kien Pham, Irvine, CA (US); Gunter Knestele, Costa Mesa, CA (US); Janak Koshia, Irvine, CA (US); Maliheh Sarikhani, Irvine, CA (US); Jeffrey Furlong, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/183,657

(22) Filed: Jun. 15, 2016

(65) Prior Publication Data
US 2017/0364446 A1    Dec. 21, 2017

(51) Int. Cl.
  *G06F 12/10* (2016.01)
  *G06F 12/1027* (2016.01)
  *G06F 12/02* (2006.01)
  *G06F 12/1009* (2016.01)

(52) U.S. Cl.
  CPC ...... *G06F 12/1027* (2013.01); *G06F 12/0246* (2013.01); *G06F 12/1009* (2013.01); *G06F 2212/657* (2013.01); *G06F 2212/7201* (2013.01)

(58) Field of Classification Search
  CPC .......................................... G06F 12/00–12/109
  See application file for complete search history.

(56) References Cited

U.S. PATENT DOCUMENTS

| | | | |
|---|---|---|---|
| 8,335,907 B2 | 12/2012 | Sinclair et al. | |
| 9,026,747 B2 | 5/2015 | Wang et al. | |
| 9,146,857 B2 | 9/2015 | Nan | |
| 9,218,279 B2 | 12/2015 | Tomlin et al. | |
| 9,569,348 B1* | 2/2017 | Deming | G06F 12/10 |
| 2003/0217237 A1* | 11/2003 | Benveniste | G06F 12/08 711/153 |
| 2005/0021904 A1 | 1/2005 | Iaculo et al. | |
| 2010/0318727 A1* | 12/2010 | Lee | G06F 12/0866 711/103 |
| 2012/0047316 A1* | 2/2012 | Post | G06F 3/0608 711/103 |
| 2012/0059976 A1* | 3/2012 | Rosenband | G06F 3/061 711/103 |

(Continued)

OTHER PUBLICATIONS

Removing the Costs and Retaining the Benefits of Flash-Based SSD Virtualization With FSDV; Yiying Zhang, Andrea C Arpaci-Dusseau, Remzi H Arpaci-Dusseau; 7 pages, Jun. 2015.

*Primary Examiner* — Nicholas Simonetti
(74) *Attorney, Agent, or Firm* — McDermott Will & Emery LLP (57) ABSTRACT

A storage device that maps logical addresses to physical addresses includes a memory that stores machine instructions and a processor coupled to the memory that executes the machine instructions to store a compressed mapping table in the memory. The compressed mapping table correlates logical addresses to locations in a storage. The storage device also stores a bundle of uncompressed mapping table entries starting at a first location in a cache and maps a first logical address associated with the uncompressed mapping table entry to the first location.

20 Claims, 10 Drawing Sheets

(56) References Cited

U.S. PATENT DOCUMENTS

2013/0262411 A1  10/2013  Kadatch
2014/0089630 A1   3/2014  Pignatelli
2015/0138884 A1*  5/2015  Park .................... G06F 13/385
                                                365/185.08

* cited by examiner

FIG. 1

| Uncompressed Table Entry | Block / Page / Die / Offset |
|---|---|
| 32'bx_00000000000000_000000000_00000000_00 | 0 / 0 / 0 / 0 |
| 32'bx_00000000000000_000000000_00000000_01 | 0 / 0 / 0 / 1 |
| 32'bx_00000000000000_000000000_00000000_10 | 0 / 0 / 0 / 2 |
| 32'bx_00000000000000_000000000_00000000_11 | 0 / 0 / 0 / 3 |
| 32'bx_00000000000000_000000000_00000001_00 | 0 / 0 / 1 / 0 |
| ... | ... |
| 32'bx_11111111111111_111111111_11111111_11 | 4095 / 511 / 255 / 3 |

COMPRESSION AND CACHING FOR LOGICAL-TO-PHYSICAL STORAGE ADDRESS MAPPING TABLES

TECHNICAL FIELD

The present disclosure relates generally to data storage and, more particularly, to formatting and caching logical-to-physical memory mapping tables for flash memory.

BACKGROUND

Address mapping tables are used to store logical-to-physical storage address translation information. For example, solid-state drives (SSDs) that implement flash memory typically store new and updated data corresponding to write operations at physical addresses that do not directly correlate to logical addresses provided by the host operating system. As a result, the logical addresses from the host operating system are conventionally mapped to physical memory cell locations in the SSD and stored in an address mapping table.

Address mapping tables may be used in other types of storage devices, as well. For example, shingled magnetic recording (SMR) hard disk drives (HDDs) typically require that write data be sequentially written to physical addresses in the chronological order of the write operations. Thus, the logical addresses may be mapped to corresponding physical addresses in the SMR HDD and stored in an address mapping table.

In some existing data storage devices, logical-to-physical (L2P) address mapping tables are stored in relatively low-latency memory to provide quick access to the address mapping tables while the storage device is in operation. As storage media capacity has increased, the required amount of high-speed memory in these storage devices has grown proportionately.

At the same time, the storage density of conventional high-speed memory has increased at a lower rate than the rate of increase in storage density of typical storage devices. In particular, larger amounts of high-speed memory commonly require increased dedicated printed circuit board assembly (PCBA) space. In addition, larger amounts of high-speed memory typically consume more power. Moreover, high-speed memory generally is relatively costly.

Some existing solutions have involved moving segments of the address mapping table between the storage media and relatively fast memory during operation. While this sort of paging scheme may reduce the required amount of high-speed memory in the device, it has an undesirable effect on performance and power consumption.

SUMMARY

According to one embodiment of the present invention, a storage device for logical-to-physical address mapping includes a memory that stores machine instructions and a processor coupled to the memory that executes the machine instructions to store a compressed mapping table in the memory. The compressed mapping table correlates logical addresses to locations in a storage. The processor further executes the instructions to store a bundle of uncompressed mapping table entries starting at a first location in a cache and map a first logical address associated with the uncompressed mapping table entry to the first location.

According to another embodiment of the present invention, a computer-implemented method for logical-to-physical address mapping includes storing a compressed mapping table in a memory. The compressed mapping table correlates logical addresses to locations in a storage. The method further includes storing a bundle of uncompressed mapping table entries starting at a first location in a cache and mapping a first logical address associated with the uncompressed mapping table entry to the first location.

According to yet another embodiment of the present invention, a computer program product for logical-to-physical address mapping includes a non-transitory, computer-readable storage medium encoded with instructions adapted to be executed by a processor to implement storing a compressed mapping table in a memory. The compressed mapping table correlates logical addresses to locations in a storage. The instructions are further adapted to implement storing a bundle of uncompressed mapping table entries starting at a first location in a cache and mapping a first logical address associated with the uncompressed mapping table entry to the first location.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the present invention provide systems and methods employing data storage address mapping table compression and caching processes for storage devices. The various embodiments produce compressed address mapping tables and dynamically cache uncompressed portions of the tables for dynamic access during storage device operation. The address mapping tables store mappings of logical addresses to physical storage addresses on the storage devices.

The logical addresses are provided by a host operating system or another upper layer. The physical storage addresses correspond to physical storage media locations in the correspondent storage device, such as flash memory locations in a solid-state drive (SSD) or disk memory locations in a shingled magnetic recording (SMR) hard disk drive (HDD). The mapping tables are indexed by the logical addresses and the table entries represent the corresponding physical addresses. The mapping tables are stored in a lossless compressed format that is conducive to the implemented compression process.

While the storage device is operating, the mapping table is stored in relatively low-latency memory in the storage devices, such as dynamic random-access memory (DRAM). When the storage device is powered off, the mapping table is saved in persistent storage media. For example, the mapping tables may be stored in NAND flash memory when the SSD is not in operation.

During operation of the storage device, portions of the mapping table are decompressed and stored in a cache section of the low-latency memory or in the same or another relatively low-latency memory, such as DRAM or static random-access memory (SRAM). The decompressed table entries of the mapping table in the cache section are used to determine the physical location of data for read and write operations involving the storage device.

When additional cache capacity is required to store more decompressed table entries, one or more decompressed table entries currently in the cache section are recompressed and removed from the cache section. The compressed mapping table is updated with the recompressed table entries.

The systems and methods described herein can offer advantages, such as reduced on-disk random-access memory (RAM) resulting in cost savings, reduced power consumption, reduced system boot time and decreased printed circuit board assembly (PCBA) space in nonvolatile memory (NVM) storage devices. The systems and methods can be particularly beneficial in combination with host input/output (I/O) workloads that are moderately-to-highly sequential, large block random or read-intensive, including but not limited to streaming video files, object store devices, big data, compressed files, and the like.

Figure 1:
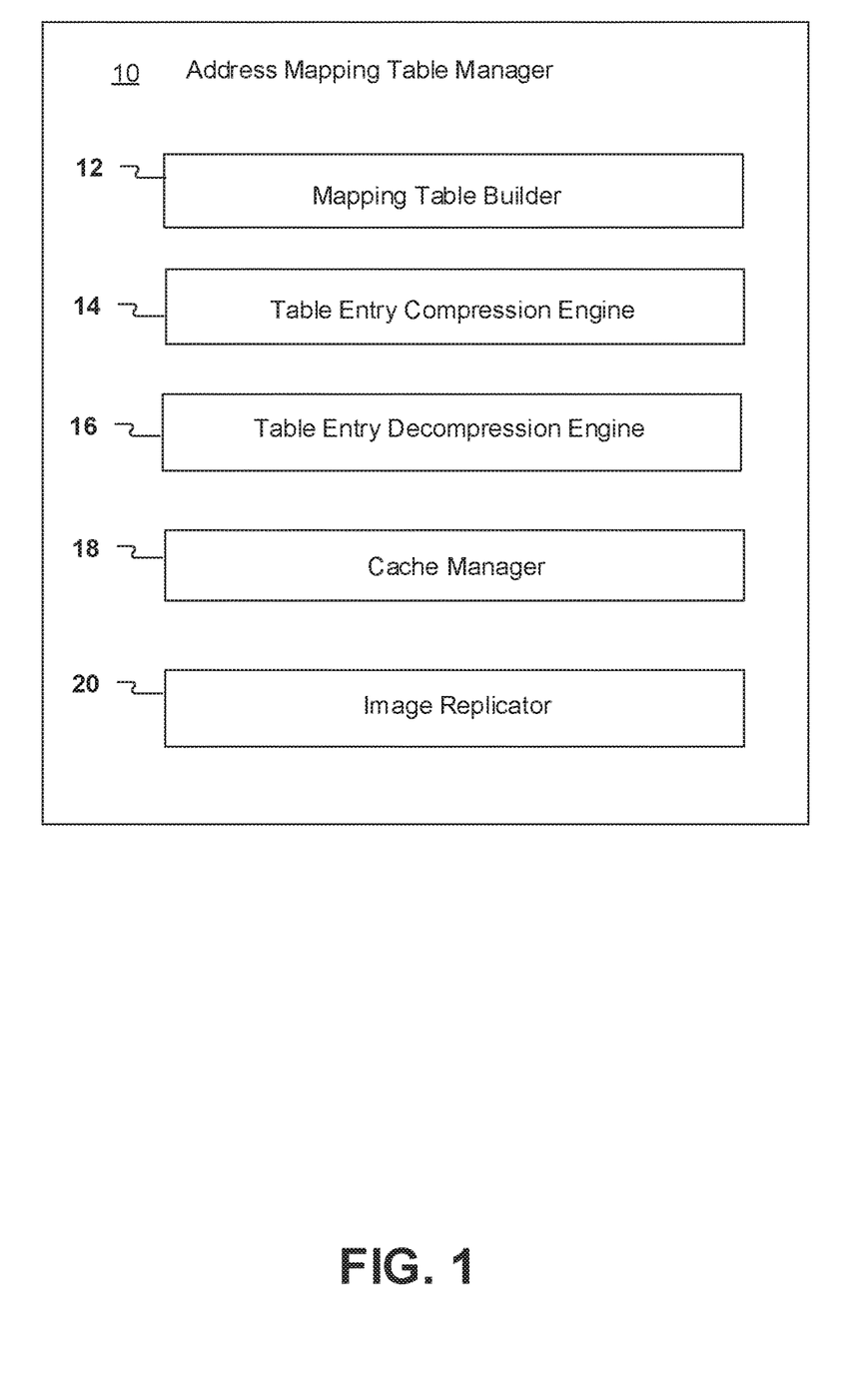
FIG. 1 is a block diagram illustrating an exemplary address mapping table manager in accordance with an embodiment of the present invention.

An embodiment of the present invention is shown in FIG. 1, which illustrates an exemplary address mapping table manager 10 that employs an address mapping table compression and caching process in order to format a compressed address mapping table and dynamically cache uncompressed portions of the table for access during storage device operation. The address mapping table manager 10 includes a mapping table builder 12, a table entry compression engine 14, a table entry decompression engine 16, a cache manager 18 and an image replicator 20.

The mapping table builder 12 formats and produces a logical-to-physical (L2P) address mapping table, such as a block translation table, for a corresponding storage device, such as a NAND flash-based solid-state drive (SSD) or a shingled magnetic recording (SMR) hard disk drive (HDD). The mapping table correlates logical addresses, such as logical-block addresses (LBAs) provided by the host operating system, with physical addresses, such as physical-block addresses of storage locations in the storage device.

The mapping table builder 12 constructs the mapping table in a format that is suitable for the implemented compression scheme. For example, in an embodiment, the table entry formatting maximizes usage of states corresponding to exponential powers of two ($2^n$, where "n" is any whole number). This criterion corresponds to the conventional design of storage media subparts, such as blocks, pages and planes, since these generally are subdivided into groupings corresponding to powers of two. The number of dies in a storage device often also corresponds to a power of two. In a preferred embodiment, the storage medium is subdivided into a hierarchy consisting of multiple levels of subparts with each successive subpart in the hierarchy corresponds to a grouping of the next subpart numbering a power of two, effectively maximizing the total number of storage address locations that can be represented by a table entry.

The table entry format further matches the physical storage addresses of the storage medium to the indirection unit format, which is the minimum amount of writable data on the storage device. For example, in an embodiment, the physical storage addresses incorporate a counter based on the respective physical block, page, die and offset corresponding to the physical location of the data in the storage medium, in the following format:

$$32'bx\_xxxxxxxxxxxx\_xxxxxxxxx\_xxxxxxxx\_xx$$

The example uncompressed table entry format includes thirty-two bits. The first bit corresponds to a collision state, or collision bit, which is set ('1') whenever the table entry is in transition. The first twelve bits following the collision bit form a block designation. The next nine bits following the block designation form a page designation. The next eight bits following the page designation form a die designation. The final two bits following the die designation form an offset designation. This format provides for a natural rollover effect from the offset designation bits to the die designation bits, from the die designation bits to the page designation bits, and from the page designation bits to the block designation bits.

Figure 2:
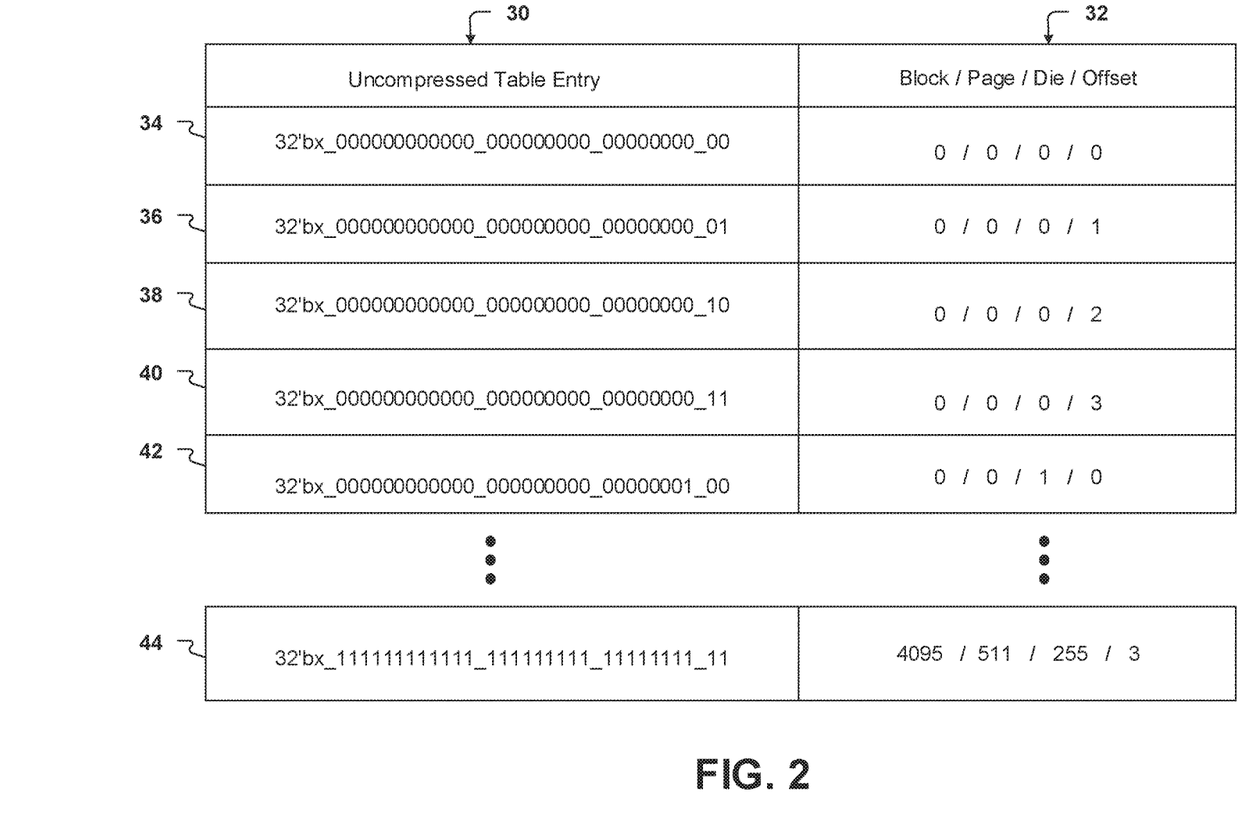
FIG. 2 a table listing an exemplary sequence of table entries that represent physical storage addresses that identify locations in a storage medium in accordance with an embodiment of the present invention.

Referring to FIG. 2, an exemplary sequence of table entries 30 representing physical storage addresses is shown, along with the corresponding physical storage locations 32. The collision state in each of the table entries 30 is not known. The first table entry 34 corresponds to the storage media location at block zero, page zero, die zero, offset zero. The second table entry 36 corresponds to the storage media location at block zero, page zero, die zero, offset one. The third table entry 38 corresponds to the storage media location at block zero, page zero, die zero, offset two. The fourth table entry 40 corresponds to the storage media location at block zero, page zero, die zero, offset three. The fifth table entry 42 corresponds to the storage media location at block zero, page zero, die one, offset zero. Additional table entries using the table entry format 30 can represent locations through the final table entry 44 corresponding to block 4095, page 511, die 255, offset 3.

The table entry compression engine 14 compresses the mapping table implementing a suitable compression scheme. For example, in an embodiment, the table entry compression engine 14 applies a compression scheme that takes advantage of any sequences of entries in the mapping table representing sequential physical storage addresses. The table entry compression engine 14 replaces each such sequence in the uncompressed mapping table with two table entries. Thus, the table entry compression engine 14 compresses the meta-data associated with the I/O data rather than the I/O data itself.

The compressed first table entry represents the initial or starting physical address of the sequential storage addresses using the same format as the uncompressed table entry format, that is, one collision bit, followed by twelve block designation bits, followed by nine page designation bits, followed by eight die designation bits, followed by two offset designation bits. The second compressed table entry represents the number of incremental addresses included in the sequence in binary format.

Thus, a two-entry sequence in the compressed format can represent a series of up to $2^{31}$ sequential addresses in the storage medium. In alternative embodiments, the bit length of the compressed table entry format varies to adjust the total number of physical address locations that can be represented and the number of bits allocated to each subpart varies to match the storage media architecture.

Using the compression scheme, a sequence of uncompressed table entries of any length representing sequential physical addresses can be reduced to two compressed table entries. The compressed mapping table representing a significantly sequential workload based on this compression scheme has a substantially reduced size, which proportionally reduces the amount of DRAM required to store the logical-to-physical address mapping table. In this sense, the compression format can be compared to run length encoding (RLE).

While the storage device is powered on, the mapping table builder 12 stores the compressed address mapping table in low-latency memory, for example, dynamic random-access memory (DRAM) or static random-access memory (SRAM), on the storage device. When the storage device is shut down, the mapping table builder 12 relocates the complete mapping table to the persistent storage medium of the storage device. Upon restart, mapping table builder 12 reconstructs the mapping table in low-latency memory for ready access during storage device operation.

Figure 3:
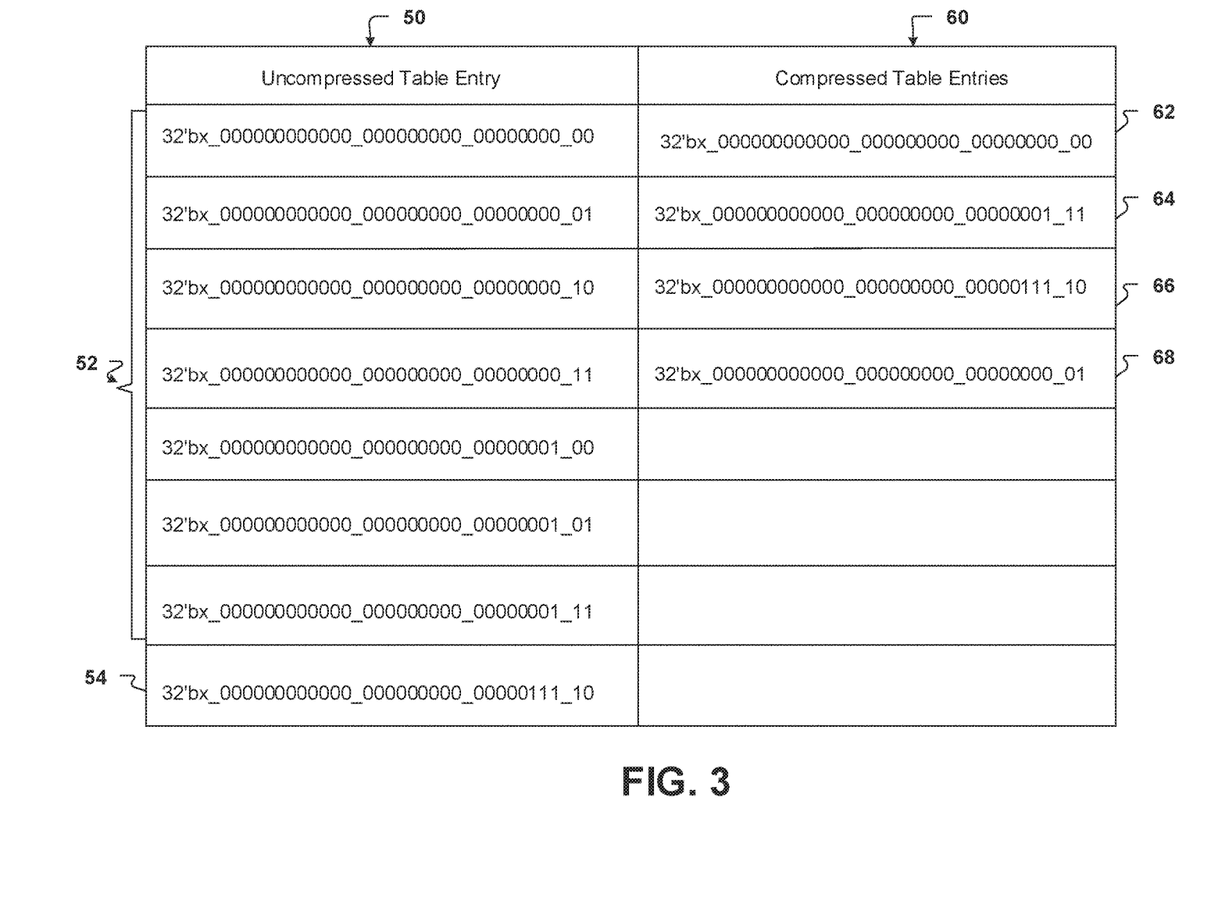
FIG. 3 is a table listing an exemplary sequence of uncompressed physical storage addresses representing a mostly sequential workload and exemplary corresponding compressed mapping table entries in accordance with an embodiment of the present invention.

Referring to FIG. 3, an exemplary sequence of uncompressed physical storage addresses 50 representing a mostly sequential workload (for example, a series of write operations at pseudo sequential storage locations totaling 4 KB of data) is shown on the left and the respective compressed representation of the same sequence of table entries 60 is shown on the right. In this example, the uncompressed mapping table sequence includes 32 bytes of meta-data, while the equivalent compressed mapping table sequence includes just 16 bytes of meta-data.

The first compressed table entry 62 and the second compressed table entry 64 together represent the sequential physical addresses of the first seven uncompressed table entries 52, from block 0, page 0, die 0, offset 0 through block 0, page 0, die 1, offset 3. The first compressed table entry 62 indicates the starting physical address of the sequence represented by the first seven uncompressed table entries 52, that is, block 0, page 0, die 0, offset 0. The second compressed table entry 64 indicates the number of incremental physical addresses included in the sequential series beginning with the starting address, that is, "eight" (binary '111').

The third compressed table entry 66 and the fourth compressed table entry 68 together represent the final uncompressed table entry 54, block 0, page 0, die 8, offset 2. The third compressed table entry indicates the starting physical address of the sequence represented by the final uncompressed table entry 54, that is, block 0, page 0, die 8, offset 2. The fourth compressed table entry indicates the number of incremental physical addresses included in the sequential series beginning with the starting address, that is, "one" (binary '001').

The table entry decompression engine 16 decompresses requested mapping table entries in accordance with the compression scheme. The table entry decompression engine 16 replaces each two-entry sequence in the compressed mapping table with a sequence of uncompressed mapping table entries representing sequential physical storage addresses. The resultant uncompressed sequence begins with the physical storage address indicated by the first of the correspondent two-entry sequence in the compressed mapping table and continues for a total number of incremental addresses equaling the second of the correspondent two-entry sequence. Thus, using the 32-bit compressed and uncompressed mapping table entry formats disclosed above, the table entry decompression engine 16 can represent each two-entry sequence in the compressed mapping table with a series of up to $2^{31}$ uncompressed sequential physical addresses.

Figure 4:
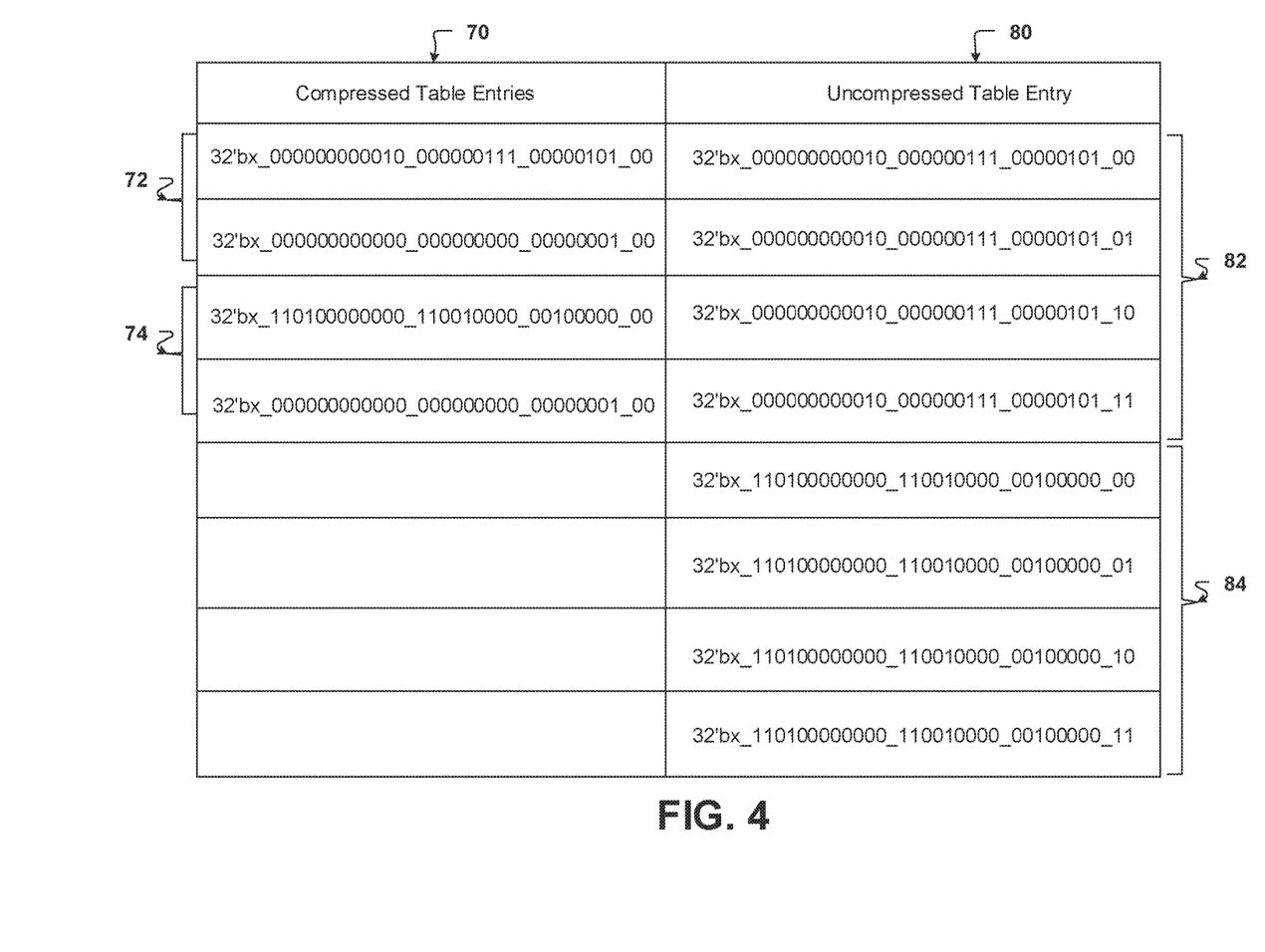
FIG. 4 is a table listing an exemplary series of compressed mapping table entries representing a large-transfer-size workload and exemplary corresponding uncompressed physical storage addresses in accordance with an embodiment of the present invention.

Referring to FIG. 4, an exemplary series of compressed mapping table entries 70 representing a large-transfer-size workload (for example, a series of write operations at random storage locations totaling 16 KB of data) is shown on the left and the respective sequence of uncompressed mapping table entries 80 corresponding to physical storage addresses is shown on the right. In this example, the compressed mapping table sequence includes 16 bytes of meta-data, while the equivalent uncompressed mapping table sequence includes 32 bytes of meta-data.

The first four uncompressed table entries 82, a group of four sequential physical addresses from block 2, page 7, die 5, offset 0 through block 2, page 7, die 5, offset 3, correspond to the first and second compressed table entries 72. The fifth through eighth uncompressed table entries 84, another group of four sequential addresses from block 3328, page 400, die 32, offset 0 through block 3328, page 400, die 32, offset 3, correspond to the third and fourth compressed table entries 74.

The cache manager 18 creates a cache area in relatively low-latency memory, for example, dynamic random-access memory (DRAM) or static random-access memory (SRAM), on the storage device and temporarily stores uncompressed mapping table entries in the cache area in accordance with a caching policy for use in the relatively near future. The cached mapping table entries are available for immediate access, for example, by a storage device translation layer, such as the flash translation layer (FTL) of a NAND-flash SSD, in order to determine the physical location of data in the storage device.

In an embodiment, when data from a logical storage address is requested by the host operating system, the cache lookup table is consulted to determine whether the address table entry corresponding to the requested LBA is currently in the cache area. In the case of a cache miss, the cache manager 18 retrieves the corresponding compressed table entry from the compressed mapping table, commands the table entry decompression engine 16 to decompress the table entry, and relocates the uncompressed mapping table entry to the uncompressed mapping table, or cached mapping table. In another embodiment, the cache manager 18 relocates multiple compressed table entries from a section of the compressed mapping table that includes the physical addresses of the locations containing the requested data to the cached mapping table.

In yet another embodiment, the cache manager 18 relocates table entries from the compressed table to the cache area based on a usage prediction scheme. For example, in an embodiment, the cache manager 18 prefetches the next bundle of compressed table entries in sequence from DRAM, decompresses the table entries and stores them in the cache area while working on the current bundle of uncompressed table entries in the cache area.

When additional space is needed in the cache area to store further uncompressed table entries for near-term use, for example, when the total quantity of meta-data currently stored in the cached mapping table approaches the capacity of the cache area, the cache manager 18 removes a table entry from the cache area, commands the table entry compression engine 14 to recompress the table entry, and relocates the compressed mapping table entry to the compressed mapping table. In another embodiment, the cache manager 18 relocates multiple cached table entries from a section of the uncompressed mapping table that includes the physical addresses of the locations containing the requested data to the compressed mapping table.

In yet another embodiment, the cache manager 18 relocates cached table entries from the cache area to the compressed mapping table based on a usage prediction scheme, such as a least recently used (LRU) algorithm. For example, each update to an uncompressed table entry in the cache area causes a velocity count increment in an LRU table, which stores the last time a table entry in a bundle has been updated. Alternatively, the LRU table may store a relative velocity count that is reset each time the storage device is powered on.

In addition, when meta-data in the compressed mapping table requires updating, the cache manager 18 decompresses and moves the relevant compressed table entries to the cache area. The cache manager 18 updates the uncompressed table entries in the cache area with revised meta-data before recompressing the table entries and moving the updated table entries back to the compressed mapping table. In this manner, the cache manager 18 stores only a limited number of relatively small sections of the uncompressed logical-to-physical address mapping table in the cached mapping table at any given time.

Figure 5:
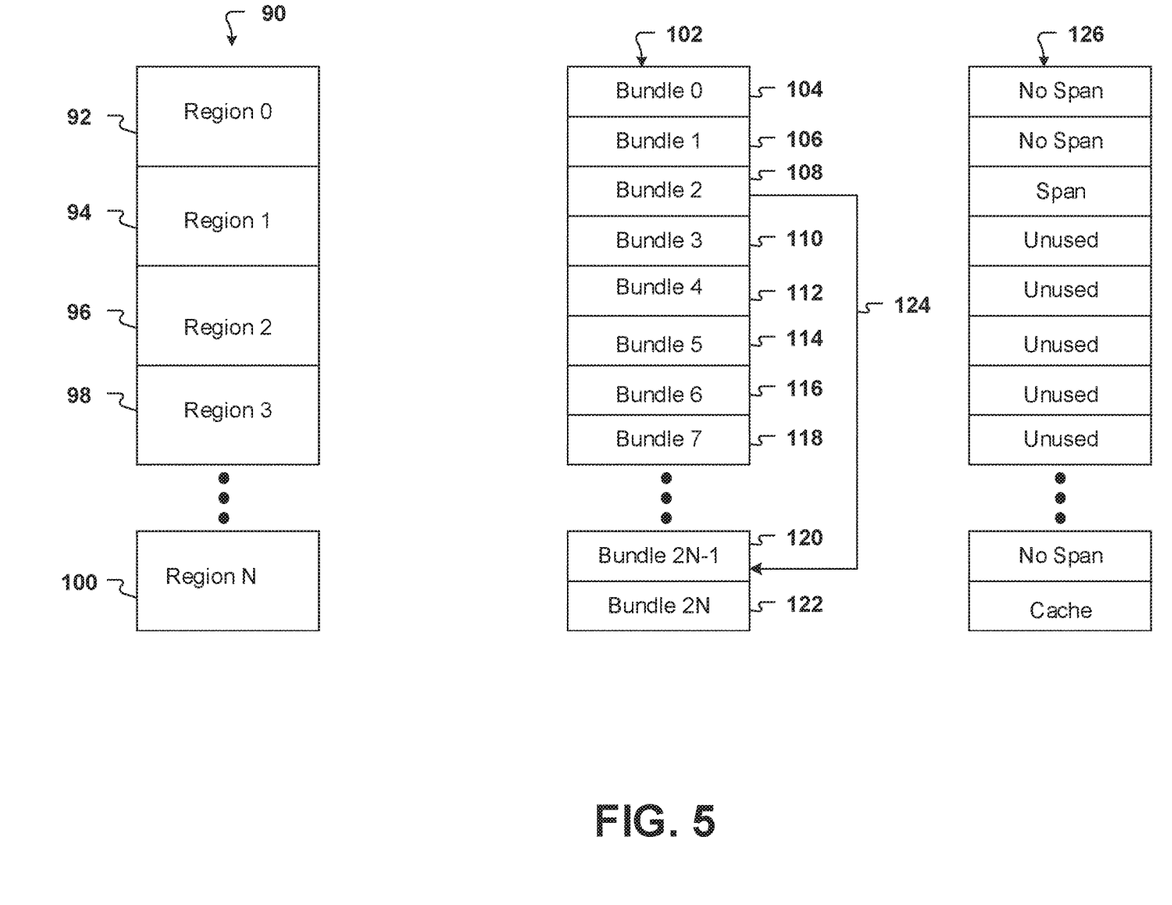
FIG. 5 is a schematic view depicting an exemplary memory architecture implementing an indexing scheme based on fixed-size bundles of uncompressed table entries in accordance with an embodiment of the present invention.

Referring to FIG. 5, an exemplary memory architecture implementing an indexing scheme based on fixed-size bundles of uncompressed table entries is illustrated. The mapping table builder 12 divides the uncompressed mapping table 90 into multiple regions of uncompressed table entries, for example, Region Zero 92, Region One 94, Region Two 96, Region Three 98, and so on through Region 'N' 100, including any suitable number of regions in accordance with the size of the uncompressed mapping table 90. Each of the regions 92, 94, 96, 98, 100 contains an equal amount of meta-data. For example, in an embodiment, each of the regions 92, 94, 96, 98, 100 includes 32 KB of meta-data, such as 8,192 uncompressed 32-bit table entries (bSize=8192). In an embodiment, the uncompressed mapping table 90 or uncompressed mapping table entries are stored in a cache area in SRAM.

The table entry compression engine 14 compresses the meta-data from the various regions 92, 94, 96, 98, 100 and the mapping table builder 12 stores the compressed meta-data in the compressed mapping table 102 beginning at a particular physical location in low-latency memory (cStartAddr). In an embodiment, the compressed mapping table 102 or compressed mapping table entries are stored in DRAM.

The mapping table builder 12 organizes the compressed mapping table 102 in multiple fixed-size bundles of compressed table entries, for example, Bundle Zero 104, Bundle One 106, Bundle Two 108, Bundle Three 110, Bundle Four 112, Bundle Five 114, Bundle Six 116, Bundle Seven 118, Bundle '2N-1' 120, Bundle '2N' 122. Each of the bundles 104, 106, 108, 110, 112, 114, 116, 118, 120, 122 contains an equal amount of compressed meta-data. For example, in an embodiment, each of the bundles 104, 106, 108, 110, 112, 114, 116, 118, 120, 122 includes 1 KB of compressed meta-data.

However, the actual amount of compressed meta-data representing each of the regions of the uncompressed mapping table 90 varies based on the level of sequentiality in the regions of the uncompressed mapping table 90. As a result, the compressed table entries corresponding to some regions of the uncompressed mapping table 90 may occupy more memory than the capacity allotted to a single bundle in the compressed mapping table 102. In this case, the compressed table entries from those regions of the uncompressed mapping table 90 may be stored in more than one bundle in the compressed mapping table 102.

Thus, in an embodiment, the initial ('N') bundles in the compressed mapping table 102 are directly correlated with the regions of the uncompressed mapping table 90. Subsequent bundles contain additional compressed meta-data from regions of the uncompressed mapping table 90 whose compressed meta-data occupies more than one bundle.

The initial bundle in the compressed mapping table 102 corresponding to a particular region of the uncompressed mapping table 90 may include a pointer to a subsequent bundle containing spillover compressed meta-data from the same region of the uncompressed mapping table 90. For example, Bundle Two 108 includes a pointer 124 to Bundle '2N-1' where the compressed table entries corresponding to Region Two 96 continue.

Although the compressed mapping table 102 in this example includes bundles numbering twice the number of the regions in the uncompressed mapping table 90, other embodiments may include any suitable number of bundles in the compressed mapping table 102. For example, the number of bundles may depend on the compressed bundle size (cSize) and the nominal compression ratio of the uncompressed mapping table 90.

The mapping table builder 12 creates a bitmap index 126 to track whether or not each bundle in the compressed mapping table 102 spans an additional bundle. For example, in an embodiment, two bits are allocated for each bundle in the bundle space, or compressed mapping table 102. The two bits in the bit array that correspond to each bundle may be set to '00' to indicate the respective bundle is unused, '01' to indicate the respective bundle is used and non-spanning, '10' to indicate the respective bundle is used and spanning, or '11' to indicated the respective bundle is used as cache.

The cache manager 18 creates a cache lookup table in relatively low-latency memory to correlate host logical addresses with the corresponding physical locations of the uncompressed table entries in the cache area. The cache lookup table (vMap) stores one entry for each bundle of uncompressed table entries currently resident in the cache area. Each entry in the lookup table contains the starting logical block address (sLBA) for the bundle, a mapping to the corresponding physical address in the cache area (mAddr) and the collision bit status for each mapping table entry in the bundle (collision table, cTable). The collision bit address corresponding to a particular logical block address requested in a read operation (rLBA) is located within the data structure as follows:

cTable entry=(rLBA−sLBA)÷widthDRAM cTable entry offset=(rLBA−sLBA) % widthDRAM cTable bit for rLBA=cTable entry+cTable entry offset where widthDRAM is the data width of the DRAM chips in bits.

In some embodiments, the compressed bundle size is dynamically varied to match the actual amount of compressed meta-data from each uncompressed bundle, eliminating unused space in the compressed mapping table. In addition, variable bundle sizes can eliminate the need for individual uncompressed bundles spanning multiple compressed bundles.

While using a fixed bundle size permits indexing and implementation with relatively low complexity, introducing variable bundle sizes can save memory space by reducing the total size of the compressed mapping table. Thus, using dynamic bundle sizes can be advantageous in implementations with minimally sequential workloads or highly sequential workloads. However, this approach adds some complexity to the indexing scheme, because an additional indirection table is required to track the individual bundle sizes, which can offset some of the memory savings.

In other embodiments, a limited number of dynamic bundle sizes are utilized to balance the advantages of fixed and variable bundle sizes. For example, an embodiment may implement a set of two different fixed bundle sizes. Meta-data from regions of uncompressed table entries having a relatively high compression ratio can be stored in the smaller size compressed bundles, while meta-data from regions with a relatively low compression ration can be stored in the larger size compressed bundles. A bundle size lookup table is created to point each uncompressed bundle to its proper location.

In a specific example, each of eight uncompressed bundles includes 32 KB of meta-data. Four of these bundles are compressible with a relatively high ratio (e.g., 1 KB each). The remaining four bundles are less compressible (e.g., 1.5 KB each). Using fixed-size compressed bundles of 1 KB with spanning, the corresponding portion of the compressed mapping table requires 12 KB of memory space:

(4×1 KB)+(4×2×1 KB)=12 KB.

On the other hand, allocating two sizes of compressed bundles, for example, four smaller bundles of 1 KB and four larger bundles of 1.5 KB, the corresponding portion of the compressed mapping table requires only 10 KB of memory space:

(4×1 KB)+(4×1.5 KB)=10 KB.

The dynamic bundle size implementation also requires a small lookup table (e.g., 3 bytes). In this example, utilizing dynamic bundle sizes would save nearly 2 KB of memory, a reduction of nearly 17 percent. In alternative embodiments, three or more bundle sizes can be used in compromise solutions to generally optimize differing expected workload types.

In one embodiment, an indirection granularity of 4 KB is implemented. The relatively fine level of granularity provides increased compressibility with larger transfer length and allows smaller transfer length traffic without an overly burdensome write amplification penalty. In other embodiments, additional indirection granularities are implemented, for example, 2 KB, 8 KB, 16 KB, 32 KB or any other suitable granularity.

The image replicator 20 transfers the complete compressed mapping table from volatile, low-latency memory to nonvolatile memory (NVM) during shutdown, or power-down, of the storage device to preserve the meta-data during periods when the low-latency memory is not powered. Each time the storage device is powered down the current compressed mapping table is saved. In an embodiment, when power-down is commanded or a power loss is detected, the table entry compression engine 14 first compresses the uncompressed table entries in the cache area and the cache manager 18 updates the compressed mapping table with all of the recompressed table entries from the cache area. The image replicator 20 duplicates the entire compressed mapping table in nonvolatile memory.

At storage device startup, or power on, the image replicator 20 transfers the complete compressed mapping table from nonvolatile memory (NVM) back to the low-latency memory. Each time the storage device is powered up the entire compressed mapping table is reconstructed in RAM for use during storage device operation.

Figure 6:
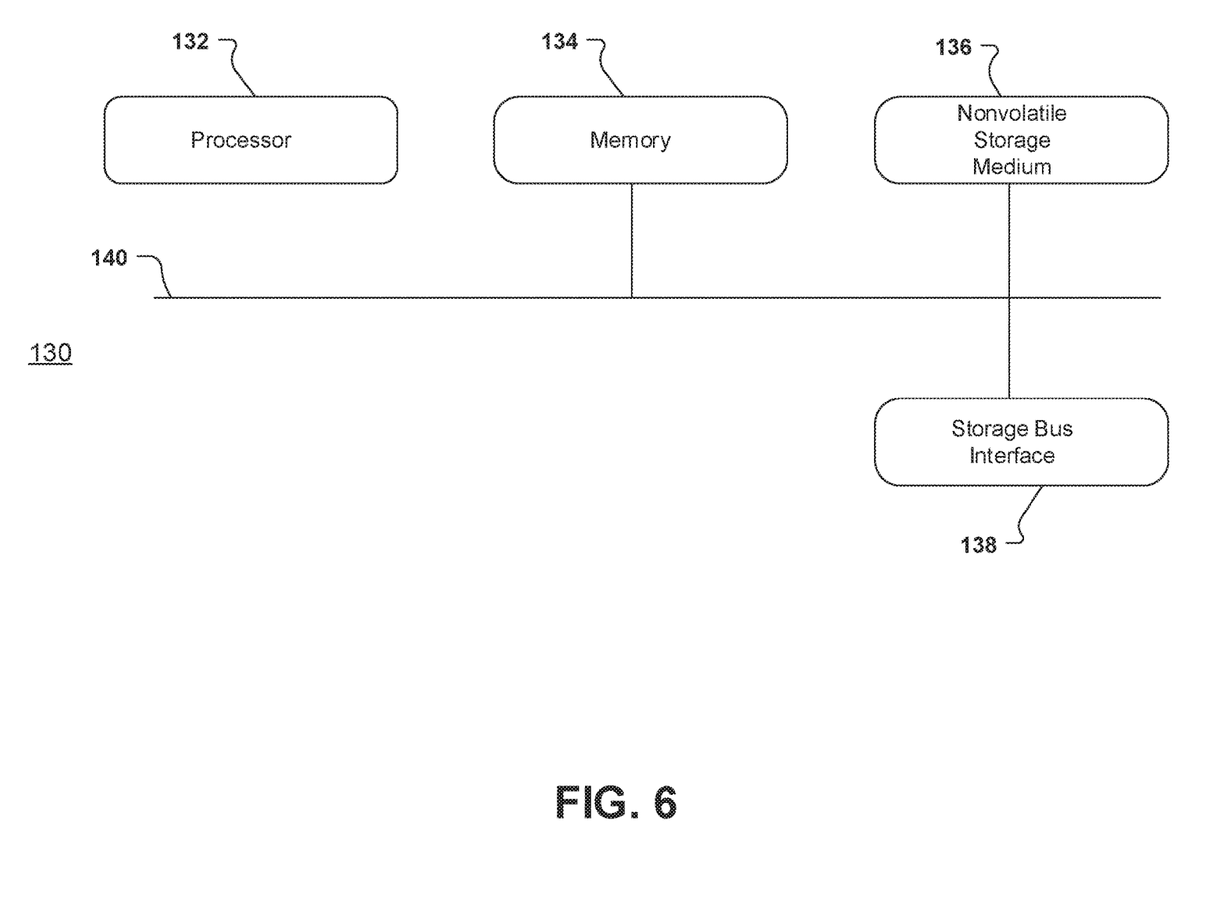
FIG. 6 is a schematic view depicting an exemplary storage device that can implement the address mapping table manager of FIG. 1.

As illustrated in FIG. 6, an exemplary storage device 130 that can be employed in the address mapping table manager 10 of FIG. 1 includes a processor 132, a memory 134, a nonvolatile storage medium 136 and a storage bus interface 138. The various components of the computing device 130 are coupled by a local data link 140, which in various embodiments incorporates, for example, an address bus, a data bus, a serial bus, a parallel bus, a storage bus, or any combination of these.

The computing device 130 can be used, for example, to implement the functions of the components of the address mapping table manager 10 of FIG. 1. Programming code, such as source code, object code or executable code, stored on a computer-readable medium, such as the memory 134 or the nonvolatile storage medium 136, can be loaded into the memory 134 and executed by the processor 132 in order to perform the functions of the address mapping table manager 10.

Figure 7:
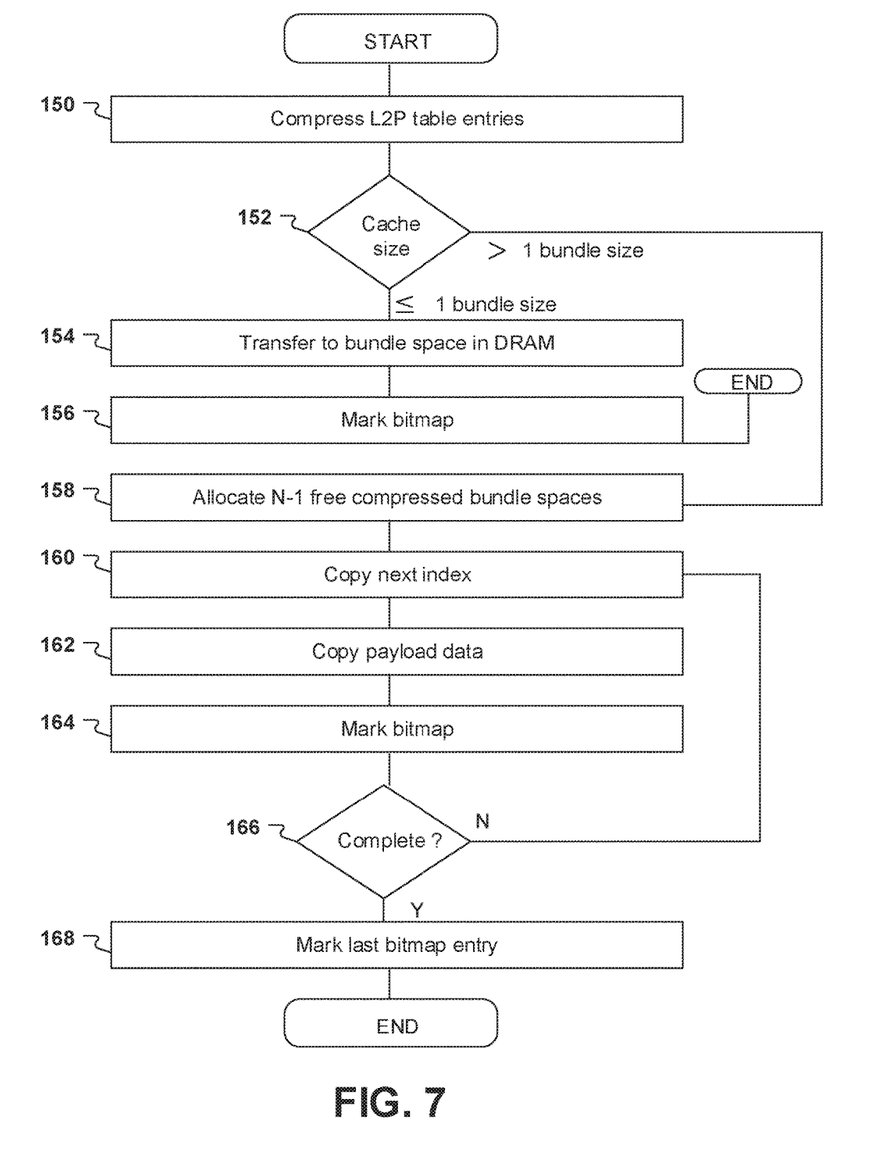
FIG. 7 is a flowchart representing an exemplary method of producing a compressed address mapping table in accordance with an embodiment of the present invention.

Referring now to FIG. 7, an exemplary process flow is illustrated that may be performed, for example, by the address mapping table manager 10 of FIG. 1 to implement an embodiment of the method described in this disclosure for producing a compressed address mapping table. The process begins at block 150, where a section of uncompressed logical-to-physical (L2P) address table entries stored in the cache area are compressed using a compression algorithm. At block 152, a size check is performed to determine if the compressed bundle of address table entries fits into a single compressed bundle area. If so, the compressed bundle is copied to the appropriate location in bundle space in DRAM, at block 154. The corresponding bitmap location is marked as used and non-spanning, at block 156.

Otherwise, if the compressed bundle is larger than one cache bundle area, the bundle map is checked, at block 158, to identify one less than the number of free compressed bundle spaces needed to store the compressed bundle of address table entries (N-1) and these are allocated to the compressed bundle. At block 160, the next bundle index is copied into the beginning of the bundle space, and the rest of the bundle space is filled with the payload data, at block 162. The corresponding bundle map entry is marked used with spanning, at block 164. The actions at blocks 160, 162 and 164 are repeated, at block 166, until the complete L2P address table section is stored. At block 168, the last map entry is marked as used without spanning. At block 170, the uncompressed bundle is evicted from cache.

Figure 8:
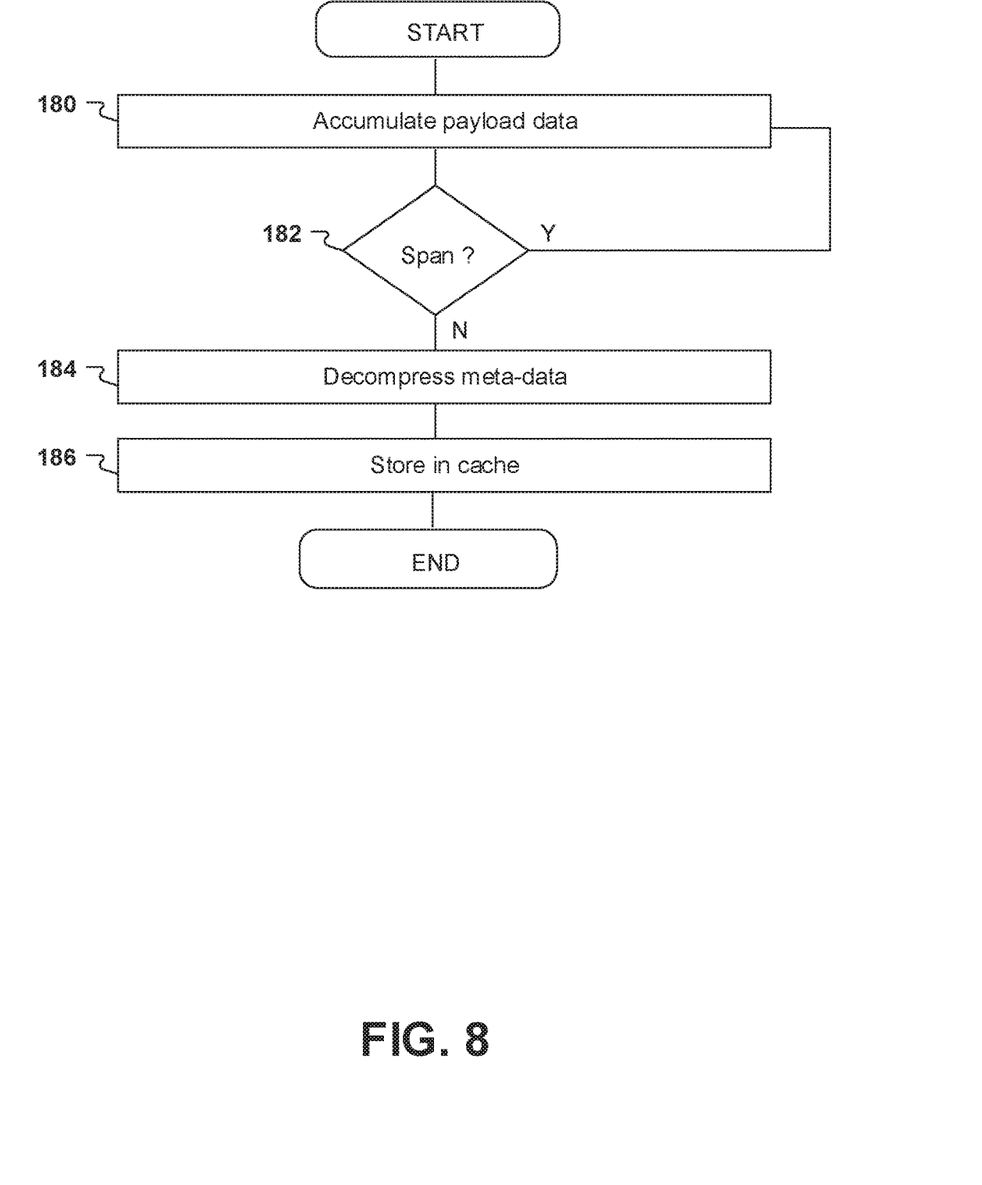
FIG. 8 is a flowchart representing an exemplary method of dynamically caching uncompressed portions of the mapping table in accordance with an embodiment of the present invention.

Referring now to FIG. 8, an exemplary process flow is illustrated that may be performed, for example, by the address mapping table manager 10 of FIG. 1 to implement an embodiment of the method described in this disclosure for dynamically caching uncompressed portions of the mapping table for access during storage device operation. The process begins at block 180, where the payload data from a compressed logical-to-physical (L2P) address table entry bundle space is accumulated. If the entry is marked as spanning, at block 182, the payload data from the bundle space corresponding to the next entry is accumulated and aggregated with the bundle. If the entry is marked as non-spanning, the meta-data is sent to the decompression engine and decompressed, at block 184. At block 186, the decompressed L2P address table entries are stored in the cache area.

Figure 9:
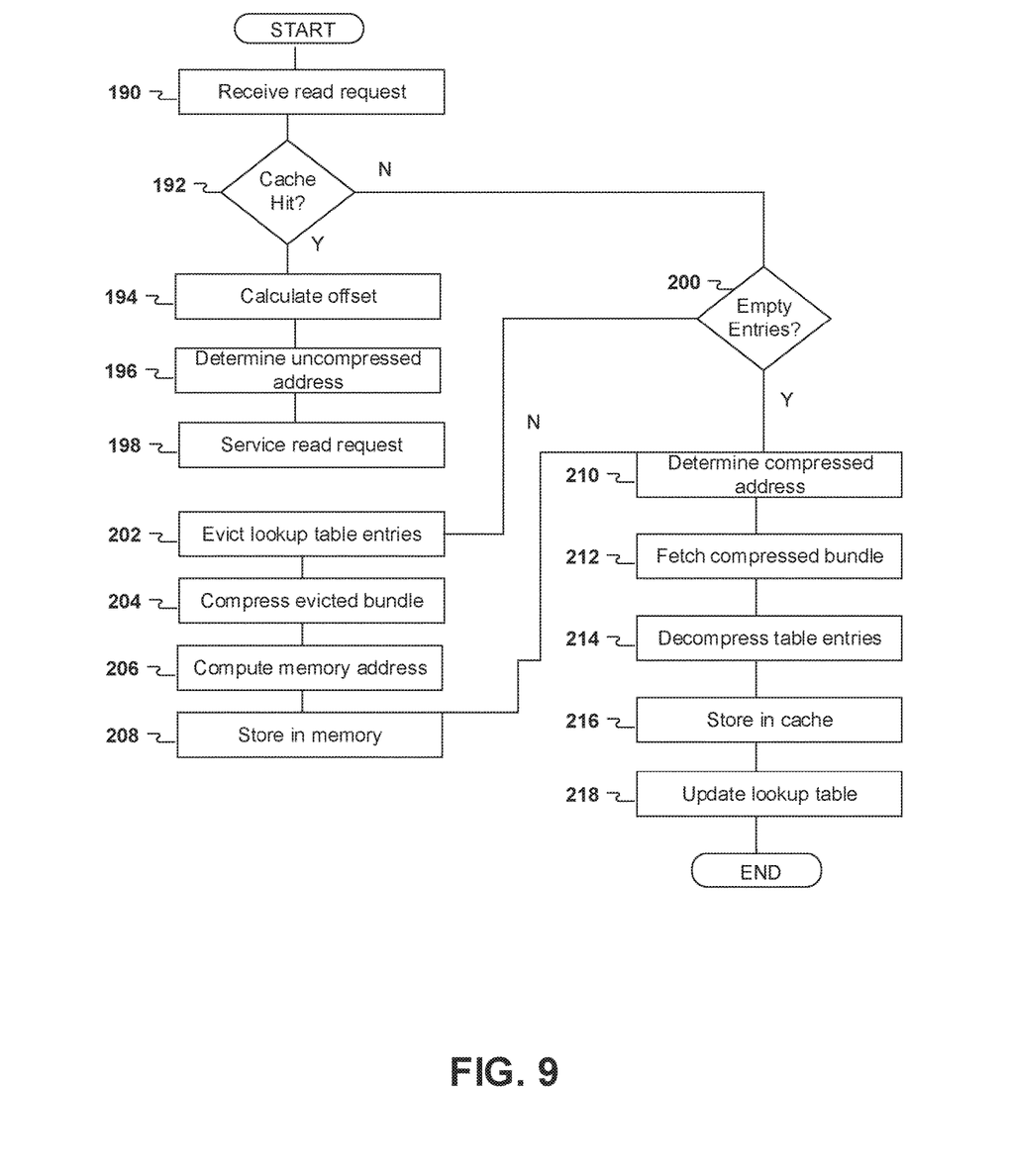
FIG. 9 is a flowchart representing an exemplary method of reading a requested read logical block address in accordance with an embodiment of the present invention.

Referring now to FIG. 9, an exemplary process flow is illustrated that may be performed, for example, by the address mapping table manager 10 of FIG. 1 to implement an embodiment of the method described in this disclosure for reading a requested read logical block address (rLBA). The process begins at block 190, where a read request regarding a host logical block address (LBA) is received from the host by the storage device. At block 192, the cache lookup table is consulted to determine whether the address table entry corresponding to the requested LBA is currently in the cache area.

If a cache hit is determined from the cache lookup table, at block 194, an address offset (oAddr) is calculated:

$$o\text{Addr} = r\text{LBA} \% s\text{LBA}$$

where % is a modulo operation, and sLBA is the starting logical block address for the bundle. At block 196, the uncompressed address (uAddr) is determined by adding the offset to the base address in the cache area (mAddr). The host read of rLBA is serviced, at block 198, using the uncompressed address, which describes the physical address in the uncompressed L2P address table, for example, in NAND.

If instead there is a cache miss, the cache lookup table is checked for empty entries, at block 200. If the cache lookup table has no empty entries, at block 202, an entry is evicted from the cache lookup table according to a cache eviction policy. The evicted bundle is compressed, at block 204. At block 206, the memory address for the compressed bundle, for example, in DRAM, is calculated as follows:

$$\text{memory address} = c\text{StartAddr} + \text{starting LBA}/b\text{Size}$$

where bSize is the uncompressed bundle size. The compressed bundle is stored in low-latency memory, such as DRAM, at block 208, beginning at the compressed starting address (cStartAddr).

Otherwise, if the cache lookup table has empty entries, the location of the compressed bundle is calculated, at block 210, as follows:

$$c\text{Addr} = c\text{StartAddr} + r\text{LBA}/b\text{Size}.$$

The compressed bundle is fetched, at block 212, from this address in low-latency memory. At block 214, the compressed bundle is decompressed, and at block 216, the uncompressed meta-data is stored in the cache area (mAddr). At block 218, the cache lookup table entry is updated with the new starting LBA (sLBA) and cache address (mAddr) mapping.

Figure 10:
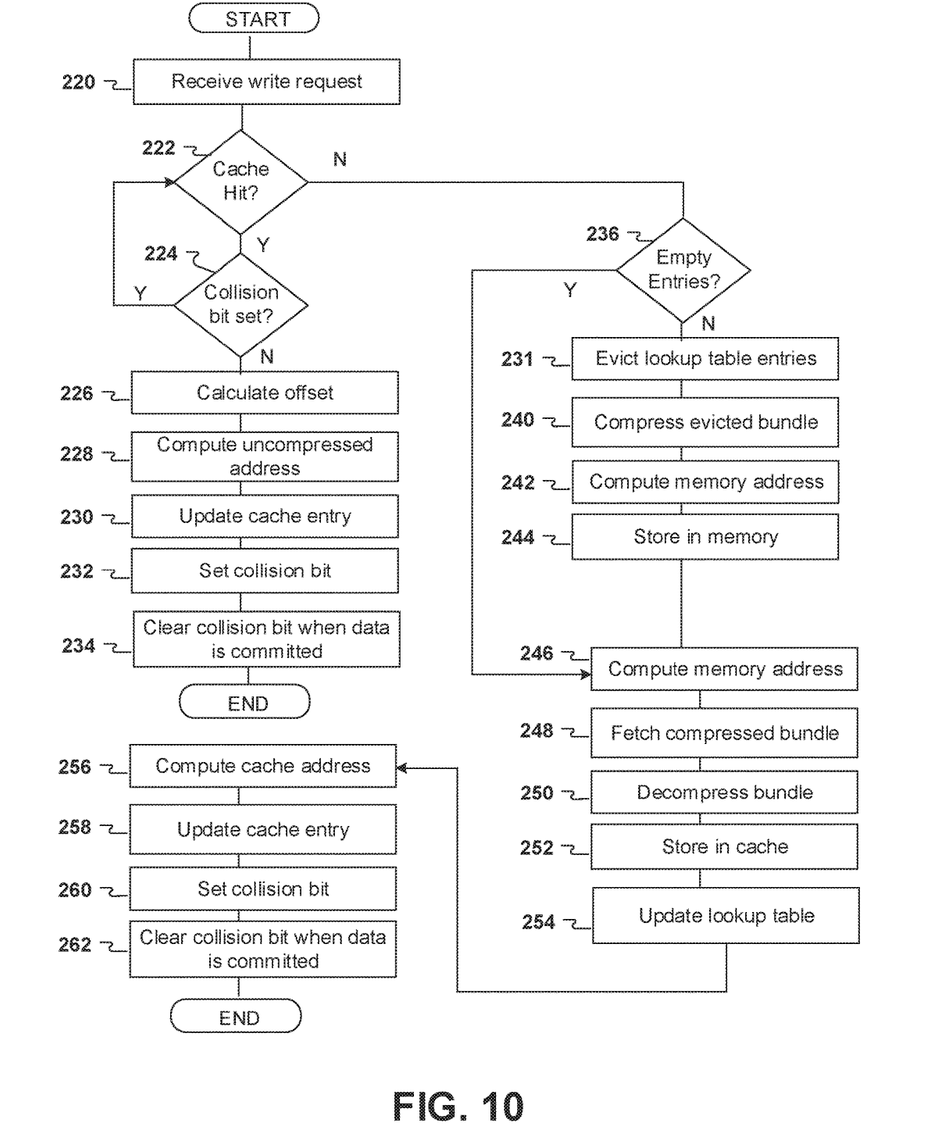
FIG. 10 is a flowchart representing an exemplary method of programming a write logical block address in accordance with an embodiment of the present invention.

Referring now to FIG. 10, an exemplary process flow is illustrated that may be performed, for example, by the address mapping table manager 10 of FIG. 1 to implement an embodiment of the method described in this disclosure for programming a write logical block address (wLBA). The process begins at block 220, where a write request regarding a host logical block address (LBA) is received from the host by the storage device. At block 222, the cache lookup table entry is checked to determine if the write LBA (wLBA) is currently cached.

If a cache hit is determined from the cache lookup table, at block 224, the corresponding collision bit is checked to verify if the collision bit is set. If the collision bit is set, the write operation is not performed until the collision bit is cleared. If the collision bit is cleared, an address offset (oAddr) is calculated, at block 226, as follows:

$$o\text{Addr} = w\text{LBA} \% s\text{LBA}.$$

The cache address (uAddr) is calculated using the base address (mAddr), at block 228, as follows:

$$u\text{Addr} = m\text{Addr} + o\text{Addr}$$

The uncompressed L2P address table entry at the cache address (uAddr) is updated, at block 230, with the next nonvolatile memory (e.g., NAND) address to be written. At block 232, the corresponding collision bit is set to one, and at block 234, the collision bit is subsequently cleared (reset to zero) once the corresponding data has been committed to nonvolatile memory.

Otherwise, if there is a cache miss, the cache lookup table is checked for empty entries, at block 236. If there are no empty entries, an entry is evicted from the cache lookup table, at block 238, according to the cache eviction policy. The evicted bundle is compressed, at block 240. The memory location, for example, in DRAM, is calculated as follows, at block 242:

$$c\text{Addr} = c\text{StartAddr} + \text{starting LBA}/b\text{Size}.$$

The compressed bundle is stored at this address in low-latency memory, at block 244.

If, on the other hand, there are empty entries in the cache lookup table, the address of the compressed bundle in low-latency memory is calculated, at block 246, as follows:

$$c\text{Addr} = c\text{StartAddr} + w\text{LBA}/b\text{Size}.$$

At block 248, the compressed bundle is fetched from this address in low-latency memory. The contents from the compressed bundle are decompressed, at block 250, and stored in the cache area (mAddr), at block 252. The cache lookup table entry is updated, at block 254, with the new starting LBA (sLBA) and cache address (mAddr) mapping. The cache address (uAddr) is calculated using the base address (mAddr), at block 256, as follows:

$$u\text{Addr} = m\text{Addr} + o\text{Addr}$$

The uncompressed L2P address table entry at the cache address (uAddr) is updated, at block 258, with the next nonvolatile memory address to be written. At block 260, the corresponding collision bit is set to one, and at block 262, the collision bit is subsequently cleared (reset to zero) once the corresponding data has been committed to nonvolatile memory.

The systems and methods described herein can offer advantages, such as reduced on-disk random-access memory (RAM) resulting in cost savings, reduced power consumption, reduced system boot time and decreased printed circuit board assembly (PCBA) space in nonvolatile memory (NVM) storage devices.

Aspects of this disclosure are described herein with reference to flowchart illustrations or block diagrams, in which each block or any combination of blocks can be implemented by computer program instructions. The instructions may be provided to a processor of a general purpose computer, special purpose computer, or other programmable data processing apparatus to effectuate a machine or article of manufacture, and when executed by the processor the instructions create means for implementing the functions, acts or events specified in each block or combination of blocks in the diagrams.

In this regard, each block in the flowcharts or block diagrams may correspond to a module, segment, or portion of code that includes one or more executable instructions for implementing the specified logical function(s). It should also be noted that, in some alternative implementations, the functionality associated with any block may occur out of the order noted in the figures. For example, two blocks shown in succession may, in fact, be executed substantially concurrently, or blocks may sometimes be executed in reverse order.

A person of ordinary skill in the art will appreciate that aspects of this disclosure may be embodied as a device, system, method or computer program product. Accordingly, aspects of this disclosure, generally referred to herein as circuits, modules, components, systems, or the like, may be embodied in hardware, in software (including source code, object code, assembly code, machine code, micro-code, resident software, firmware, etc.), or in any combination of software and hardware, including computer program products embodied in a computer-readable medium having computer-readable program code embodied thereon.

It will be understood that various modifications may be made. For example, useful results still could be achieved if steps of the disclosed techniques were performed in a different order, and/or if components in the disclosed systems were combined in a different manner and/or replaced or supplemented by other components. Accordingly, other implementations are within the scope of the following claims.

What is claimed is:

1. A storage device for logical-to-physical address mapping, comprising:
   a memory that stores machine instructions; and
   a processor coupled to the memory and configured to execute the machine instructions, wherein the machine instructions, when executed, cause the processor to:
      construct a mapping table comprising a plurality of table entries, wherein the mapping table is indexed by logical addresses and each of the table entries comprises a corresponding physical address in a storage,
      replace a first sequence of the plurality of table entries comprising sequential physical addresses with a first compressed mapping table entry and a second compressed mapping table entry to generate a compressed mapping table, the first compressed mapping table entry representing an initial physical address of the sequential physical addresses in a same format as a corresponding table entry of the plurality of table entries, and the second compressed mapping table entry representing a number of incremental addresses in the first sequence;
      store the compressed mapping table in the memory,
      store a plurality of uncompressed mapping table entries starting at a first location in a cache, and
      map a first logical address associated with a first uncompressed mapping table entry to the first location in the cache.

2. The storage device of claim 1, wherein the machine instructions, when executed, further cause the processor to:
   determine a second logical address is not currently mapped to the cache,
   retrieve a compressed mapping table entry associated with the second logical address from the compressed mapping table,
   decompress the compressed mapping table entry to yield a plurality of uncompressed mapping table entries,
   store the plurality of uncompressed mapping table entries starting at a second location in the cache, and
   map the second logical address to the second location.

3. The storage device of claim 1, wherein the machine instructions, when executed, further cause the processor to:
   determine the cache lacks sufficient available space,
   evict the mapping of the first logical address to the first location,
   compress the plurality of uncompressed mapping table entries to yield a compressed mapping table entry, and
   update the compressed mapping table with the compressed mapping table entry.

4. The storage device of claim 1, wherein the machine instructions, when executed, further cause the processor to transfer the compressed mapping table to a nonvolatile memory at power down.

5. The storage device of claim 1, wherein the machine instructions, when executed, further cause the processor to format the plurality of mapping table entries, each comprising a distribution of bits among a plurality of designations correlated with an organization of the storage.

6. The storage device of claim 1, wherein the machine instructions, when executed, further cause the processor to maintain a lookup table including a lookup entry corresponding to a bundle space, wherein the lookup entry indicates whether or not an uncompressed mapping table entry spans an additional bundle space.

7. The storage device of claim 1, wherein the compressed mapping table comprises a plurality of bundle spaces of equal size, each of the uncompressed mapping table entries corresponding to one or more of the bundle spaces.

8. The storage device of claim 1, wherein the memory comprises a dynamic random access memory, the cache comprises a static random access memory, and the storage comprises a NAND-flash memory.

9. The storage device of claim 8, wherein the logical addresses comprise logical block addresses received from a host computer and the locations in the storage comprise physical blocks.

10. A method for logical-to-physical address mapping, comprising:
    constructing a mapping table comprising a plurality of table entries, wherein the mapping table is indexed by logical addresses and each of the table entries comprises a corresponding physical address in a storage;
    replacing a first sequence of the plurality of table entries comprising sequential physical addresses with a first compressed mapping table entry and a second compressed mapping table entry to generate a compressed mapping table, the first compressed mapping table entry representing an initial physical address of the sequential physical addresses in a same format as a corresponding table entry of the plurality of table entries, and the second compressed mapping table entry representing a number of incremental addresses in the first sequence;

storing the compressed mapping table in a memory;

storing a plurality of uncompressed mapping table entries starting at a first location in a cache; and mapping a first logical address associated with a first uncompressed mapping table entry to the first location in the cache.

11. The method of claim 10, further comprising:

determining a second logical address is not currently mapped to the cache;

retrieving a compressed mapping table entry associated with the second logical address from the compressed mapping table;

decompressing the compressed mapping table entry to yield a plurality of uncompressed mapping table entries;

storing the plurality of uncompressed mapping table entries starting at a second location in the cache; and mapping the second logical address to the second location.

12. The method of claim 10, further comprising:

determining the cache lacks sufficient available space;

evicting the mapping of the first logical address to the first location;

compressing the plurality of uncompressed mapping table entries to yield a compressed mapping table entry; and updating the compressed mapping table with the compressed mapping table entry.

13. The method of claim 10, further comprising formatting a plurality of uncompressed mapping table entries, each comprising a distribution of bits among a plurality of designations correlated with an organization of the storage.

14. The method of claim 10, further comprising transferring the compressed mapping table to a nonvolatile memory at power down.

15. The method of claim 10, further comprising maintaining a lookup table including a lookup entry corresponding to a bundle space, wherein the lookup entry indicates whether or not an uncompressed mapping table entry spans an additional bundle space.

16. The method of claim 10, wherein the compressed mapping table comprises a plurality of bundle spaces of equal size, each of the uncompressed mapping table entries corresponding to one or more of the bundle spaces.

17. The method of claim 10, wherein the memory comprises a dynamic random access memory, the cache comprises a static random access memory, and the storage comprises a NAND-flash memory.

18. The method of claim 17, wherein the logical addresses comprise logical block addresses received from a host computer and the locations in the storage comprise physical blocks.

19. A non-transitory, computer-readable storage medium encoded with instructions adapted to be executed by a processor to implement:

constructing a mapping table comprising a plurality of table entries, wherein the mapping table is indexed by logical addresses and each of the table entries comprises a corresponding physical address in a storage;

replacing a first sequence of the plurality of table entries comprising sequential physical addresses with a first compressed mapping table entry and a second compressed mapping table entry to generate a compressed mapping table, the first compressed mapping table entry representing an initial physical address of the sequential physical addresses in a same format as a corresponding table entry of the plurality of table entries, and the second compressed mapping table entry representing a number of incremental addresses in the first sequence;

storing the compressed mapping table in a memory;

storing a plurality of uncompressed mapping table entries starting at a first location in a cache; and mapping a first logical address associated with a first uncompressed mapping table entry to the first location in the cache.

20. The computer-readable storage medium of claim 19, wherein the instructions are further adapted to implement transferring the compressed mapping table to a nonvolatile memory at power down, wherein the memory comprises a dynamic random access memory, the cache comprises a static random access memory, and the storage comprises a NAND-flash memory.

* * * * *